United States Patent [19]

Sakai et al.

[11] Patent Number: 4,528,633
[45] Date of Patent: Jul. 9, 1985

[54] METHOD OF CONTROLLING INDEXING OF MAGAZINE POCKETS IN MACHINING CENTER

[75] Inventors: Takayoshi Sakai, Kagamihara; Shinji Sano, Konan; Koji Matsumoto, Aichi, all of Japan

[73] Assignee: Yamazaki Machinery Works, Ltd., Niwa, Japan

[21] Appl. No.: 437,170

[22] Filed: Oct. 27, 1982

[30] Foreign Application Priority Data

Nov. 5, 1981 [JP] Japan .................. 56-178074

[51] Int. Cl.³ .................. G06F 15/46; G05B 19/28
[52] U.S. Cl. .................. 364/474; 364/140; 29/568
[58] Field of Search .............. 364/140, 146, 148, 152, 364/171, 188, 191–194, 474; 29/568; 235/383, 385; 408/31, 33, 35, 40; 51/1, 2 R, 2 A; 83/549–550, 552, 555

[56] References Cited

U.S. PATENT DOCUMENTS

| | | |
|---|---|---|
| 4,109,188 | 8/1978 | Shima et al. ............ 29/568 X |
| 4,151,642 | 5/1979 | Holland et al. ........... 29/568 X |
| 4,185,376 | 1/1980 | Johnstone ............... 29/568 |
| 4,220,062 | 9/1980 | Blanz .................. 83/549 X |
| 4,312,105 | 1/1982 | Brown ................. 29/568 X |
| 4,342,088 | 7/1982 | Sato .................... 364/474 |
| 4,414,732 | 11/1983 | Tomita et al. ............ 29/568 |
| 4,417,377 | 11/1983 | Brezina ................. 29/568 X |
| 4,430,717 | 2/1984 | Senda et al. ............ 364/474 |

FOREIGN PATENT DOCUMENTS 1360441 7/1974 United Kingdom .
1438943 6/1976 United Kingdom .
1526715 9/1978 United Kingdom .

Primary Examiner—Jerry Smith
Assistant Examiner—Gary V. Harkcom
Attorney, Agent, or Firm—Cushman, Darby & Cushman

[57] ABSTRACT

A method of controlling the indexing of magazine pockets in a machining center. The tools used in a current machining program are compared with the tools to be employed in the next machining program. When there are tools used in both programs, the pocket numbers of the tools in the present machining program are indexed to the identical tools to be used in the next machining program. The data concerning such common tools are displayed together with the indexed pocket numbers.

5 Claims, 8 Drawing Figures

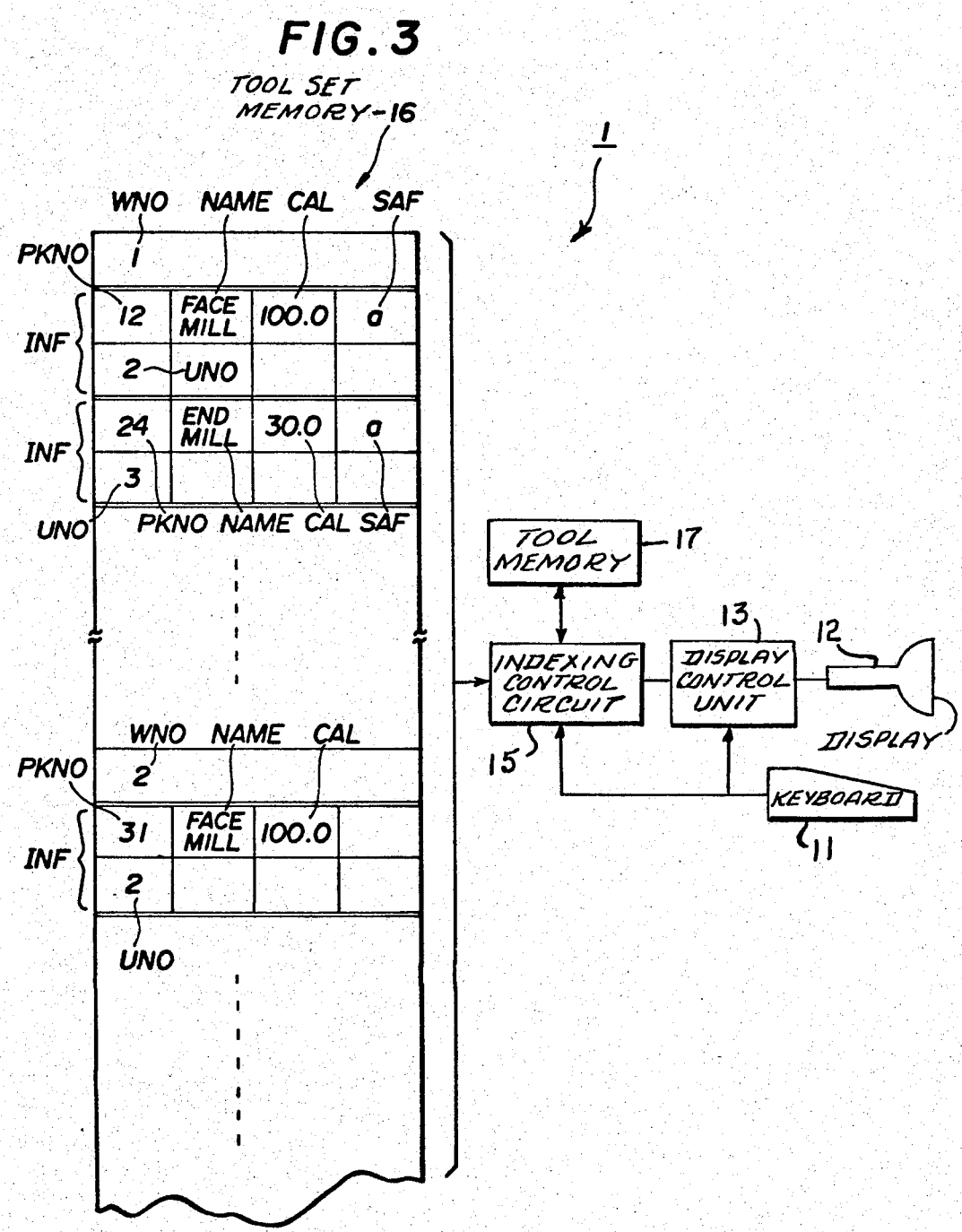

FIG. 4

| PKNO | GNO | NAME | CAL | SAF | | | | | | | STANDBY | | | | WORK NO | | | |
|---|---|---|---|---|---|---|---|---|---|---|---|---|---|---|---|---|---|---|
| PRESENT | | | WORK NO | | | | | | | | PKNO-GNO | TOOL NAME | NOMINAL SIZE | PKNO-GNO | TOOL NAME | NOMINAL SIZE | | |
| PKNO-GNO | TOOL NAME | NOMINAL SIZE | PKNO | TOOL NAME | NOMINAL SIZE | | | | | | 99 - 9 | ddddd | 999.9d | 99 - 9 | ddddd | 999.9d | | |
| 1-0 | | SPOT DRILL | 5.0a | 16-0 | | | | | | | | | | | | | | |
| 2-0 | | | 6.5a | 17-0 | | | | | | | | | | | | | | |
| 3-0 | | END MILL | 25.0 | 18-0 | | | | | | | | | | | | | | |
| 4-0 | | FACE MILL | 60.0 | 19-0 | | | | | | | | | | | | | | |
| 5-0 | | ..... | ..... | 20-0 | | | | | | | | | | | | | | |
| 6-0 | | FACE MILL | 100.0 | 21-0 | | | | | | | | | | | | | | |
| 7-0 | | ..... | ..... | 22-0 | | | | | | | | | | | | | | |
| 8-0 | | BORING | 40.0 | 23-0 | | | | | | | | | | | | | | |
| 9-0 | | CHAMFERR-ING CUTTER | 45.0 | 24-0 | | | | | | | | | | | | | | |
| 10-0 | | BACKSIDE SPOT FACE | 18.0a | 25-0 | | | | | | | | | | | | | | |
| 11-0 | | TAP | M12 | 26-0 | | | | | | | | | | | | | | |
| 12-0 | | TAP | PT1/8 | 27-0 | | | | | | | | | | | | | | |
| 13-0 | | TAP | PF1/4 | 28-0 | | | | | | | | | | | | | | |
| 14-0 | | REAMER | 10.0 | 29-0 | | | | | | | | | | | | | | |
| 15-0 | | SPECIAL | | 30-0 | | | | | | | | | | | | | | |

| WORK NO | | PKNO CLEAR | PKNO SHIFT | PKNO INDEX | APPOINT SPARE TOOL | LAYOUT FINISHED |
|---|---|---|---|---|---|---|

FIG. 5

| PRESENT PKNO-GNO | TOOL NAME | WORK NO 1 NOMINAL SIZE | STANDBY PKNO-GNO | TOOL NAME | WORK NO 2 NOMINAL SIZE |
|---|---|---|---|---|---|
| 1 - 0 | SPOT | 5.0 | [1] - 0 | SPOT | 5.0 |
| 2 - 1 | DRILL | 6.0a | | DRILL | 5.0a |
| 3 - 1 | DRILL | 6.0b | [2] - 0 | DRILL | 6.0a  SAF |
| 4 - 0 | END MILL | 30.0  SAF | [4] - 0 | END MILL | 30  SAF |
| 5 - 0 | BORING | 40.0a | | BORING | 40 |
| 6 - 0 | BORING | 50.0  SAF | [8] - 0 | FACE MILL | 100.0 |
| 7 - 0 | ... | .. | | GNO NAME | CAL |
| 8 - 0 | FACE MILL | 100.0 | PKNO | | |

PKNO — GNO NAME CAL

FIG. 6

| STANDBY PKNO-GNO | TOOL NAME | NOMINAL SIZE |
|---|---|---|
| [1] - 0 | SPOT | 5.0 |
| - 1 | DRILL | 5.0a |
| - 1 | DRILL | 5.0b  SAF |
| [2] - 0 | DRILL | 6.0a  SAF |

PKNO GNO NAME CAL

FIG. 7

| STANDBY PKNO-GNO | TOOL NAME | NOMINAL SIZE |
|---|---|---|
| [1] - 0 | SPOT | 5.0 |
| 3 - 1 | DRILL | 5.0a |
| 5 - 1 | DRILL | 5.0b |
| [2] - 0 | DRILL | 6.0a |

PKNO GNO NAME CAL SAF

FIG.8

| PRESENT 12c | | WORK NO2 | STANDBY | | | WORK NO2 12d |
|---|---|---|---|---|---|---|
| PKNO-GNO | TOOL NAME | NOMINAL SIZE | PKNO | GNO | TOOL NAME | NOMINAL SIZE |
| [1]-0 | SPOT | 5.0 | [1]-0 | | SPOT | 5.0 |
| [2]-0 | DRILL | 6.0a | 3-1 | | DRILL | 5.0a |
| 3-1 | DRILL | 5.0a | 5-1 | | DRILL | 5.0b |
| [4]-0 | END MILL | 30 | [2]-0 | | DRILL | 6.0a |
| 5-1 | DRILL | 5.0b | [4]-0 | | END MILL | 30  SAF |
| 6-0 | BORING | 40 | 6-0 | | BORING | 40 |
| 7-0 | • • • | SAF CAL | [8]-0 | | FACE MILL | CAL |
| [8]-0 | FACE MILL | | | | NAME | |
| 9-0 | • • • | | | | | |

PKNO  GNO  NAME          PKNO   GNO

METHOD OF CONTROLLING INDEXING OF MAGAZINE POCKETS IN MACHINING CENTER

BACKGROUND OF THE INVENTION

The present invention relates to a method of controlling the indexing of magazine pockets in a machining center.

Hitherto, in working out a machining program to be used in a machining center, it is customary for the programmer to form the program without having any on-line communication with the controller of the machining center. Namely, the programmer does not know, when he forms the new program, the present state of indexing of tools in the magazine established with respect to the previous machining program. Thus, the present state of indexing of tools, presented by the previous machining program, is not taken into consideration when the programmer forms the new program.

Certain programs or inconveniences are caused from this fact. Namely, the operator who is going to execute the new program is obliged to demount all tools from the magazine and then to rearrange the tools in the magazine pockets in accordance with the new program, even if some of the tools already in the magazine are usuable in the execution of the new program. As a consequence of this procedure, handling time is prolonged due to the useless work of demounting and mounting the tools which are usable in the execution of the new program. One approach to obviating this problem, has been for the programmer to modify the new machining program while visually checking the tools arranged on the magazine. Such an approach, however, requires considerable time and labor for programming, thereby unduly burdening the programmer.

SUMMARY OF THE INVENTION

Accordingly, it is a primay object of the invention to eliminate the above-described problems of the prior art by providing a novel method of controlling the indexing of magazine pockets in machining center, in which the setting or the resetting of the tools on a tool magazine is accomplished without requiring demounting and mounting of tools which are common to both the present machining program and the new machining program.

This invention provides an indexing method applicable to a machining center having a magazine provided with a plurality of pockets each bearing its own pocket No., a tool set memory for storing the names of tools to be used for each of a plurality of workpieces, and a display. For machining a workpiece, the pocket Nos. are indexed to the tools which are in the tool set memory and which are to be used in the machining of the workpiece. The tools are set in the magazine pockets in accordance with the indexed pocket numbers.

The indexing includes the following steps: checking and comparing the tools used in the present machining program with the tools to be employed in the next machining; indexing, when there are identical tools used commonly in both machining programs, the pocket Nos. in the present machining program to the identical tools to be employed in the next machining program; and displaying the identical tools and the pocket numbers indexed thereto on the display.

The above and other objects, features and advantages of the invention will become clear from the following description of the preferred embodiment taken in conjunction with the accompanying drawings.

BRIEF DESCRIPTION OF THE DRAWINGS

FIG. 3 is a block diagram of a control section for controlling the indexing of magazine pockets in the machining center shown in FIG. 1; and FIGS. 4 thru 8 are illustrations of examples of display put on a display device.

DESCRIPTION OF THE PREFERRED EMBODIMENTS

The invention will be fully described hereinunder with reference to the drawings illustrating a preferred form of the invention.

Figure 1:
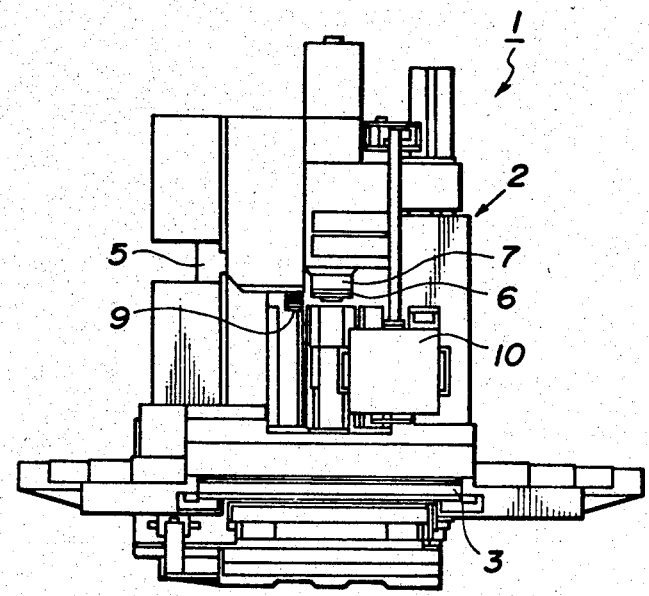
FIG. 1 is a front elevational view of an example of a machining center to which the present invention is applied.
Figure 2:
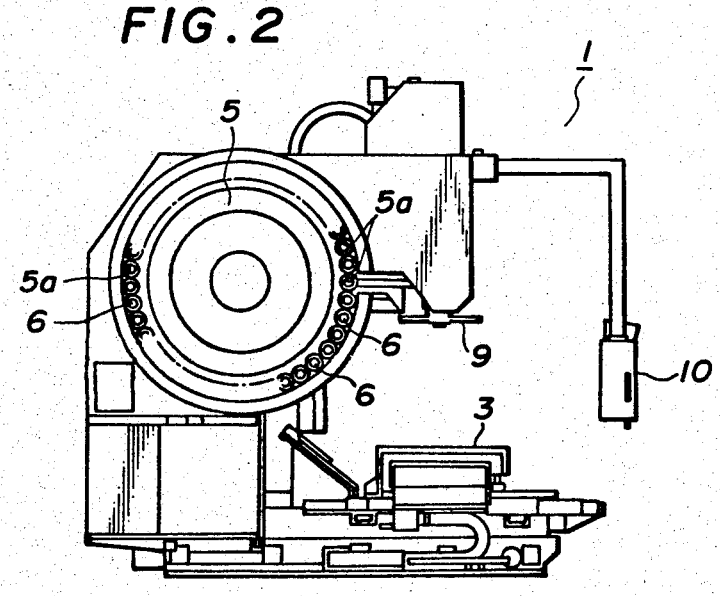
FIG. 2 is a side elevational view of the machining center shown in FIG. 1.

Referring now to FIGS. 1 and 2, there are shown front and side elevational views, respectively, of a machining center 1 to which the method of the invention is applied. Machining center 1 has a main body 2 and an X-Y table 3 which is movable in a horizontal plane in two orthogonal directions relatively to the main body 2. The X-Y table 3 can carry a workpiece to be machined. A substantially disc-shaped magazine 5 is rotatably mounted on the main body 2. The magazine 5 is provided on its outer periphery with a plurality of magazine pockets 5a at a constant circumferential pitch. Each pocket is identified by an identification No., i.e. pocket No., of its own, and is adapted to receive a tool 6. A spindle 7 is rotatably carried by a portion of the main body 2 above the X-Y table 3. A tool exchanger 9 disposed at the left side of the spindle 7 as viewed in FIG. 1 is adapted to withdraw from the magazine 5 a tool for the next step of machining process and mount the same on the spindle 7, while demounting the old tool 6 from the spindle 7 and returning the same into the magazine 5. Referring now to FIG. 3 there is shown a block diagram of a control section for controlling the indexing of the magazine pockets. A key board 11 and a display 12 are provided on a control panel 10 which in turn is mounted on the main body 2 of the machining center 1. A tool indexing control unit 15 is connected directly to the key board 11 and indirectly to the display 12 through a display control unit 13. In addition, a tool set memory 16 and a tool memory 17 are connected to the indexing control unit 15. The tool set memory 16 stores, for each of the workpiece (one for each of the machining programs) a work No. WNO. Machining informations INF, consisting of the names NAME of the tools to be used and the sequence of use of these tools, are stored in the adresses following the work No. WNO, in a downward order as viewed in the drawing. Besides the tool names NAME, the machining informations INF include various data such as the nominal sizes of the tools CAL, section suffix SAF, machining unit No. UNO for specifying the kind of machining to be achieved by each tool, and the pocket No. PKNO of the pocket storing each tool.

In the machining center having the described construction, the machining of the workpiece is executed in accordance with the machining program, i.e. the series of machining informations INF identified by the work No. WNO in the tool set memory 16. In the meantime, the operator can index the pockets in terms of pocket No. PKNO for the tools to be used in the next machining program, according to the following procedure described with reference to FIGS. 4–8 which show display 12 in various states.

First, the operator provides an instruction to cause a display of the pocket Nos. PKNO of the pockets holding the tools presently used in the machining program under execution, on the left half part of the display 12 as viewed in FIG. 4. In response to this instruction, the tool indexing control unit 15 reads data such as pocket No. PKNO, tool name NAME, nominal size CAL and the section suffix SAF from the machining informations INF corresponding to the work No. WNO of the work under machining. The control unit 15 then stores these data in the tool memory 17, and orders the display control unit 13 to display these data on a "present" display section 12c (displayed as "PRESENT" on the picture surface 12a) of the display 12. Simultaneously, a menu 12b for selection is displayed on the lower part of the picture surface 12a.

Then, the operator depresses the key on the key board 11 in accordance with the content of the display "WORK NO" and then inputs the work No. WNO of the work to be machined by the next machining program. In response to the input of the work No. WNO, the tool indexing control unit 15 reads the machining informations INF corresponding to the inputted work No. WNO from the tool set memory 16 and stores the same in the tool memory 17. The data constituting this machining information INF are displayed on the right half part of the picture surface 12a constituting a "standby" display section 12d represented as "STANDBY" on the picture surface 12a. At this time, the "standby" display section 12d displays the old pocket Nos. PKNO of the tools which have been contained by the machining informations INF in the tool set memory 16. The operator then depresses the key corresponding to the display of PKNO CLEAR to clear corresponding pocket NOS. PKNO. Then, the operator depresses a key corresponding to a display PKNO SHIFT, so that the tool indexing control unit 15 operates to make the tool memory 17 compare the data such as tool name NAME, nominal size CAL and so forth on the "present" display section 12c with those in the "standby" display section 12d for all of the tools. Assume here that the comparison indicates that some of the tools displayed on the "present" section 12c are identical to those displayed on the "standby" display section 12d. The tool indexing control unit 15 then shifts the Nos. PKNO of such tools on the "pesent" display section 12c to the position of the identical tools on the "standby" display section 12d, as indicated by arrows in FIG. 5, i.e. indexing of pocket Nos. PKNO is made for such identical tools. In the event that the identical tools have a section suffix SAF, the tool indexing control unit 15 asks the operator to confirm the identity of the tool and, if identical, the operator gives an affirmative answer through the key board to permit the indexing of the pocket No. for such affirmed tool. In this operation, the operator is informed of the pocket Nos. PKNO corresponding to the identical tools displayed on the "standby" display section 12d to which the Nos. PKNO have been allotted, through inversion of flickering of the display of such pocket Nos. PKNO. Such pocket Nos. are surrounded by squares in the drawings.

The operator then depresses a key corresponding to "APPOINT SPARE TOOL", so that the control unit 15 operates to make a display of a spare tool which is to be prepared as a spare of a tool indicated by a cursor 12e, as shown in FIG. 6. The spare tool is the tool of the same kind and same nominal size as the tool indicated by the cursor. For instance, assuming here that the tool indicated by the cursor is a drill 5.0a, a drill 5.0b is displayed as the spare tool. Then, the same group No. GNO as the indicated tool is given to the display of the spare tool. In this state, the "standby" display section displays the same pocket Nos. PKNO as the presently indexed pockets only for the tools 6 presently set in the magazine. Therefore, the operator needs not take the trouble of making setting on the magazine for those tools to which the pocket Nos. PKNO have been allotted already in this stage, and is allowed to directly turn to the machining program for the next work. Namely, the operator depresses a key corresponding to "PKNO INDEX" so that the control unit 15 operates to suitably index the pocekt Nos. PKNO for the tools to which the pocket Nos. PKNO have not been allotted yet, i.e. such tools that are not set in the magazine 5 used in the presently executed machining program but are to be newly set before turning to the next machining program. After the completion of this indexing operation, the operator depresses a key corresponding to "LAYOUT FINISHED", so that the display control unit 13 erases the display on the "present" display section and shifts the content of display on the "standby" display section 12d to the "present" display section 12c. During this shift, the reordering of display is made so that the new display on the "present" display section is made in the order of the pocket Nos. PKNO. The operator then demounts the tools of the tool Nos. which are not surrounded by the square on the "present" display section from the magazine pockets 5a of the magazine 5 and sets the new tools on display in the corresponding pockets in accordance with the pocket Nos. displayed on the "present" display section. All tools necessary for the next machining operation are thus set in the magazine 5. Simultaneously with the indexing of the pocket Nos. PKNO, the pocket Nos. PKNO contained by the machining informations INF of the corresponding work No. WNO are rewritten in the tool set memory 16 to prepare for the actual machining operation.

As will be understood from the foregoing description, according to the invention, there is provided an indexing control method in which tools used in the present machining program are checked and compared with the tools which are to be employed in the next machining, and, if there are any tool or tools employed commonly by both programs, the pocket Nos. of such tools in the present program are allotted or indexed to the identical tools in the next machining program and such tools together with the indexed pocket Nos. PKNO are displayed on the display 12. Therefore, the operator is required only to demount and mount tools other than the tools employed commonly in both programs, so that the holding time required for the layout of tools in the machining center 1 is shortened remarkably.

Although the invention has been described through specific terms, it is to be noted here that the described embodiment is only illustrative and various changes and modifications may be imparted thereto without departing from the scope of the invention which is limited solely by the appended claims.

What is claimed is:

1. In a machining center having a magazine provided with a plurality of pockets each bearing its own pocket number, a tool set memory storing data corresponding to the means of the tools to be used and the pocket numbers of said pockets in said magazine in which said tools are stored for each of a plurality of machining programs for respective workpieces, and a display, a method of indexing of magazine pockets comprising the steps of:

setting tools in the magazine pockets in accordance with the pocket numbers corresponding to a first machining program stored in said tool set memory;

executing the first machining program;

comparing the tools names used in the first machining program with the tool means to be employed in a second machining program by reading out data corresponding to the names of the tools used in said second program from said tool set memory;

indexing, when there are identical tools used commonly in said first and second machining programs, the pocket numbers in the first machining program to the identical tools to be employed in the second machining program;

rewriting pocket number data corresponding to the identical tools used in said second machining program in said tool set memory in accordance with said indexed pocket numbers;

displaying data concerning said identical tools and the pocket numbers indexed thereto on said display; and setting the tools for said second machining program by only mounting and demounting the tools that are not common to the first and second machining programs.

2. A method according to claim 8, wherein said step of displaying data comprises the step of displaying names and nominal sizes of said identical tools.

3. A method according to claim 2 wherein said step of displaying comprises the step of displaying (a) the names of tools not identical with any of those of said first machining program and which have to be newly set into the magazine and (b) the names of tools which need not be set in the magazine, in such a manner that the (a) and (b) tools are distinguishable from one another.

4. A method according to claim 1, further comprising the step of displaying the names, nominal sizes and pocket numbers of the tools used in the first and second machining programs simultaneously on said display to facilitate said comparing step.

5. A method according to claim 4 wherein said step of displaying comprises the steps of displaying (a) the names of tools not identical with any of those of said first machining program and which have to be newly set into the magazine and (b) the names of tools which need not be set in the magazine, in such a manner that the (a) and (b) tools are distinguishable from one another.

* * * * *